United States Patent [19]
Weed et al.

[11] 3,968,913
[45] July 13, 1976

[54] PROTECTIVE COVER FOR AUTOMOBILE MOUNTED BICYCLE CARRIER

[76] Inventors: Terrance O. Weed, 53 Addison Ave.; Daniel Mougel, 67 Vreeland Ave., both of Rutherford, N.J. 07070

[22] Filed: May 5, 1975

[21] Appl. No.: 574,304

[52] U.S. Cl. .......................... 224/42.03 B; 150/3; 150/52 K; 296/78.1
[51] Int. Cl.² .................................... B60R 9/10
[58] Field of Search ............. 224/42.03 R, 42.03 A, 224/42.03 B, 42.04–42.08, 29 R, 30 R; 150/52 R, 52 K, 1, 3; 206/335; 211/17–22; 296/37, 78.1, 136; 214/450

[56] References Cited
UNITED STATES PATENTS

| | | | |
|---|---|---|---|
| 2,950,034 | 8/1960 | Osborn | 224/42.03 A |
| 3,877,622 | 4/1975 | McLain | 224/42.03 B |

Primary Examiner—L. J. Paperner
Assistant Examiner—Winston H. Douglas
Attorney, Agent, or Firm—Samuelson & Jacob

[57] ABSTRACT

A protective cover for attachment to an automobile mounted bicycle carrier to preclude exposure of the bicycle to the ambient environment having a back of flexible material with openings therein to permit the cover to be mounted to the carrier, a set of openings in the back to permit a strap to pass therethrough to secure the bicycle to the carrier, a front of flexible material affixed at one edge to the back, a closure having its elements affixed to the free edges of the front and back to permit the cover to be closed to protect the bicycle, the upper portions of the front and back forming a top flap to allow for various seat and handle bar heights, the top flap overlays the front when it is folded down and is cooperatively attachable to the front by means of a Velcro fastener or similar fastening device so that the protective cover is not loose and does not flap in the breeze when the vehicle is in motion.

7 Claims, 4 Drawing Figures

PROTECTIVE COVER FOR AUTOMOBILE MOUNTED BICYCLE CARRIER

The invention relates to protective covers for bicycles which are carried on a frame affixed to the rear of an automobile.

In particular, the invention relates broadly to a cover formed of flexible material such as canvas having a front and a back. The back fits on the frame and the cover is closed by means of one or more zipper closures affixed to the free edges of the front and back. A lock may be used to hold the adjoining sliders of the zippers in the closed position. A top flap is affixed to the back and front to allow for differences in seat and handle bar heights and it is folded over to minimize flapping due to air flow when the vehicle is in motion. The zippers may be supplied with a fabric overlay similar to that used on trousers in order to protect the zippers from the weather and/or the zippers may be made of nonrusting material such as aluminum or noncorrosive material such as plastic. Suitable fasteners such as Velcro hold the top flap in place against the front of the cover. Drain holes, commonly called weep holes, may be provided in the bottom to prevent the collection of water within the closure.

Prior art carriers either did not use protective covers so that there was no protection from the weather or there was no simple, easy way for the bicycle in a protective cover to be carried on the rear of an automobile.

It is an important object of the invention to provide a protective cover for a frame mounted bicycle which may be readily closed and opened to facilitate easy mounting and dismounting of the bicycle from the carrying frame.

It is a further object of the invention to provide such a device having openings in the back thereof to facilitate its mounting on the frame.

These and other objects, advantages, features and uses will be apparent during the course of the following description when taken together with the accompanying drawing wherein.

Figure 2:
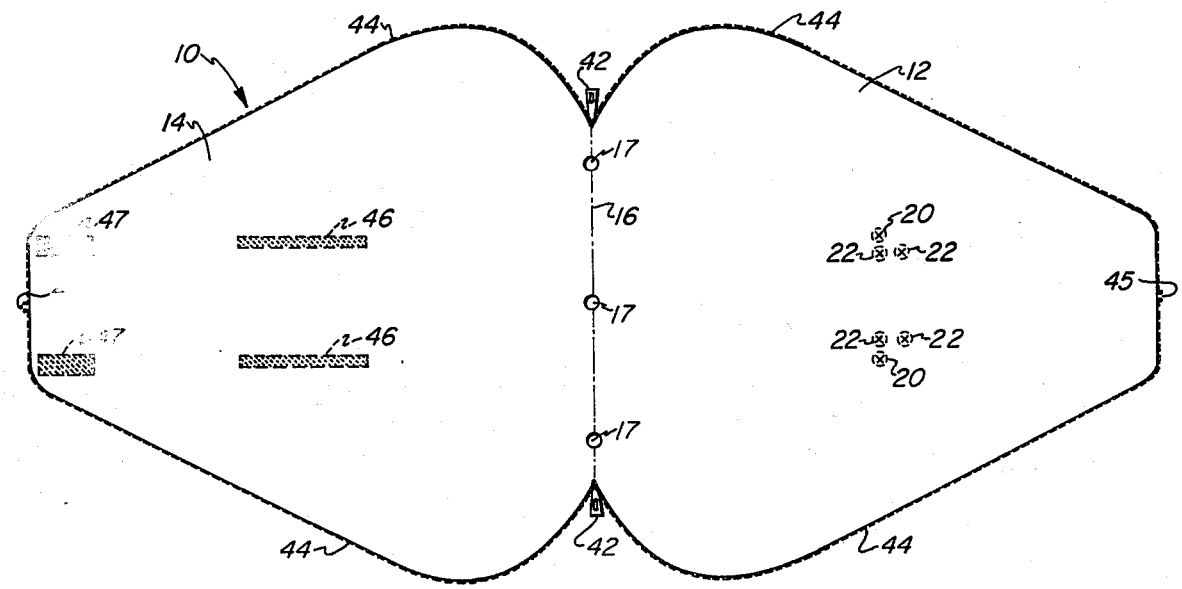
FIG. 2 is a plan view of the cover of the invention, laid open to show its construction.
Figure 3:
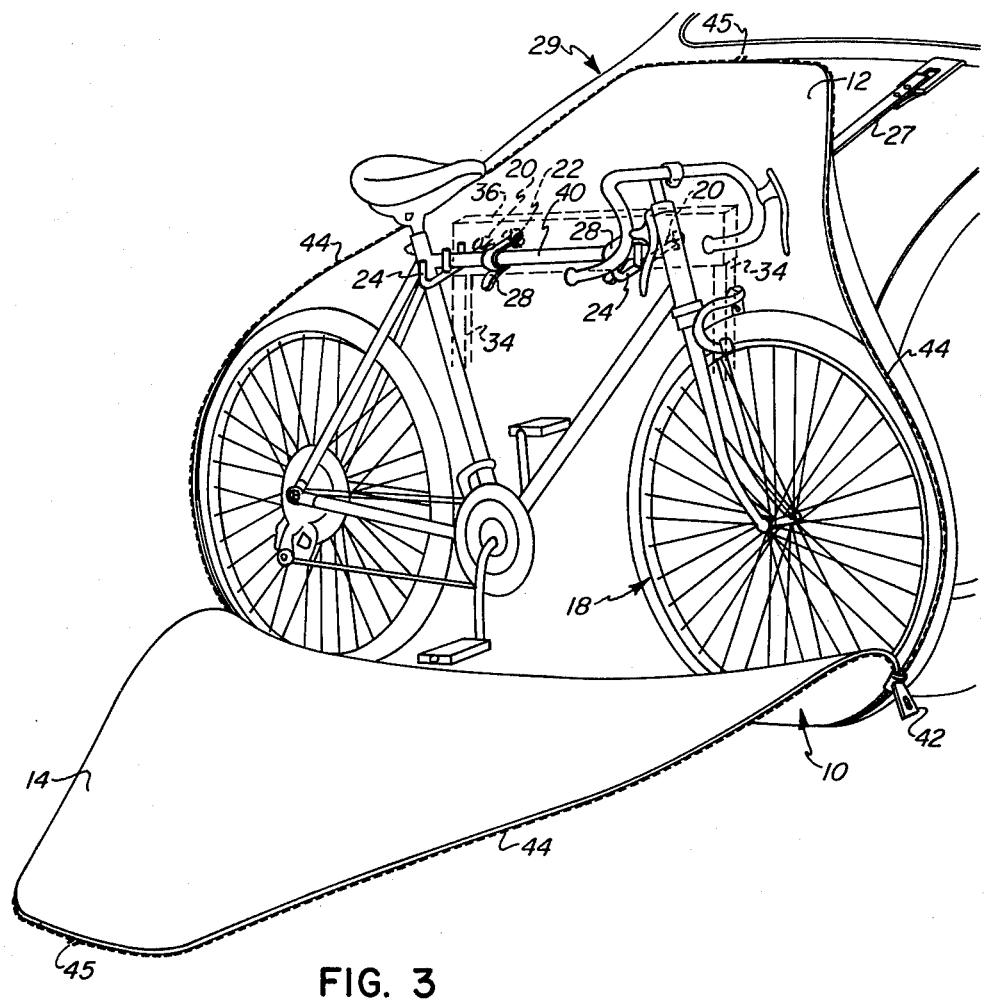
FIG. 3 is a view similar to that of FIG. 1 showing the cover of the invention in the open position.

In the drawing, wherein, for the purpose of illustration, there is shown a preferred embodiment of the invention and wherein like numerals designate like parts throughout the same, the numeral 10 designates a protective cover of the invention, generally. Cover 10 is seen to comprise (FIG. 2), a back 12 of flexible fabric such as canvas or similar material, a front 14 affixed to back 12 along edge 16. A pair of self closing openings 20, commonly referred to as rosettes are provided to fit over a pair of hangers 24 (FIGS. 3 and 4) of the support frame 26. Two similar pairs of rosette openings 22 are provided, each of these pairs of openings 22 receives a strap 28 to hold a bicycle 18 rigidly on the frame 26. Drain holes 17, commonly referred to as weep holes, are provided to permit any moisture which collects or condenses inside the cover to drain off.

Frame 26 is mounted to a bumper 30 of an automobile 29 by means of a pair of brackets 32 (FIG. 4), there being one bracket on each side of the frame. A pair of vertical struts 34 extend upward from brackets 32 and terminate in a top horizontal bar 36. The hangers 24 are affixed to bar 36 and are provided to hold the horizontal bar 40 of bicycle 18. The straps 28 are attached around bar 36 through rosettes 22 and are pulled tight around bar 40 of bicycle 18 to hold the bicycle in position.

The top of frame 26 is held to the rear of the automobile by means of straps 27. To place the cover in position ready for use, the rear or back portion 12 of the cover 10 is slipped over hangers 24 which fit through rosettes 20. Next, the bicycle 18 is mounted on the hangers 24 and the straps 28 are fed through rosettes 22 and tightened about bar 40 of bicycle 18. Now, front 14 is folded up over the bicycle 18 and the sliders 42 of zippers 44 are closed so the sliders 42 meet at the top of the cover, designated as 45.

Figure 1:
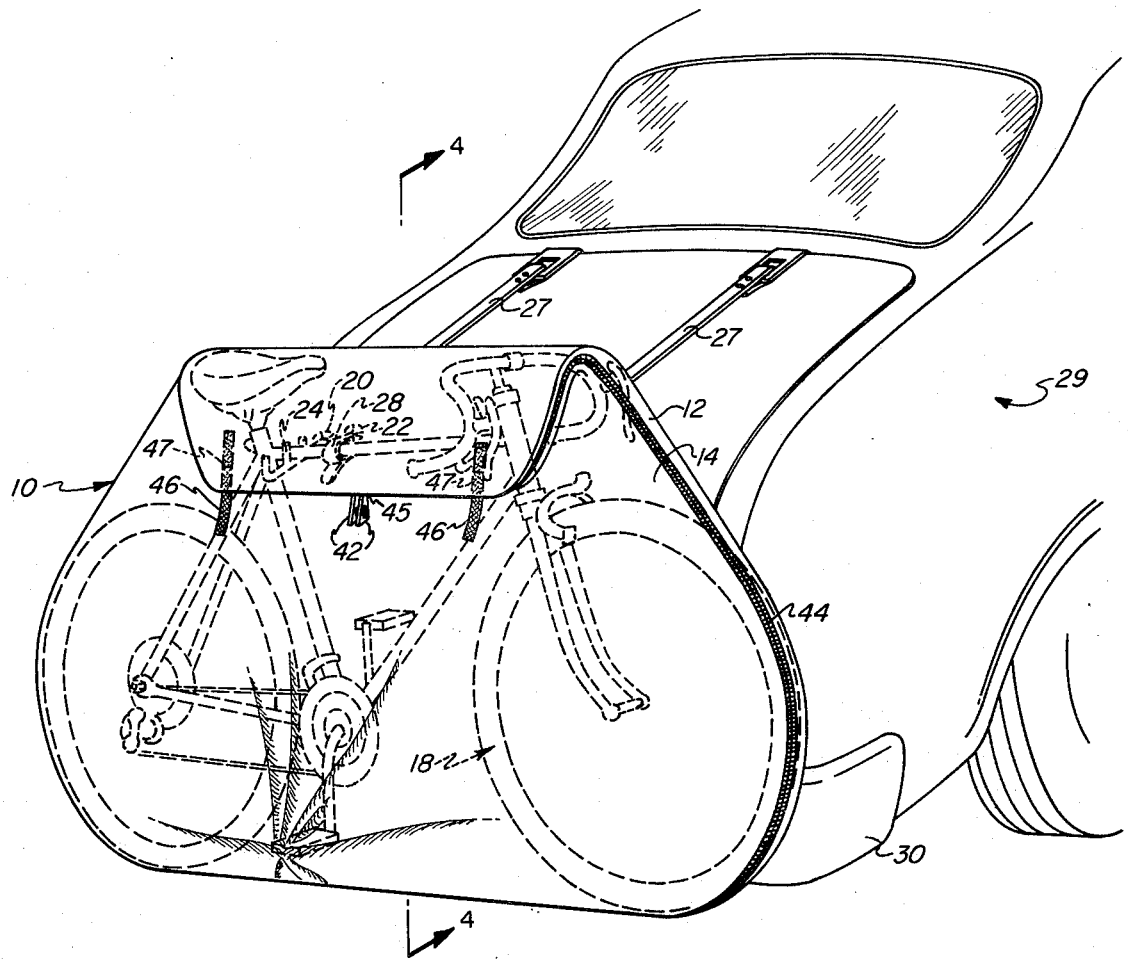
FIG. 1 is a perspective view of the rear of an automobile showing a bicycle mounted on a frame mounted on the automobile and enclosed by a protective cover of the invention.
Figure 4:
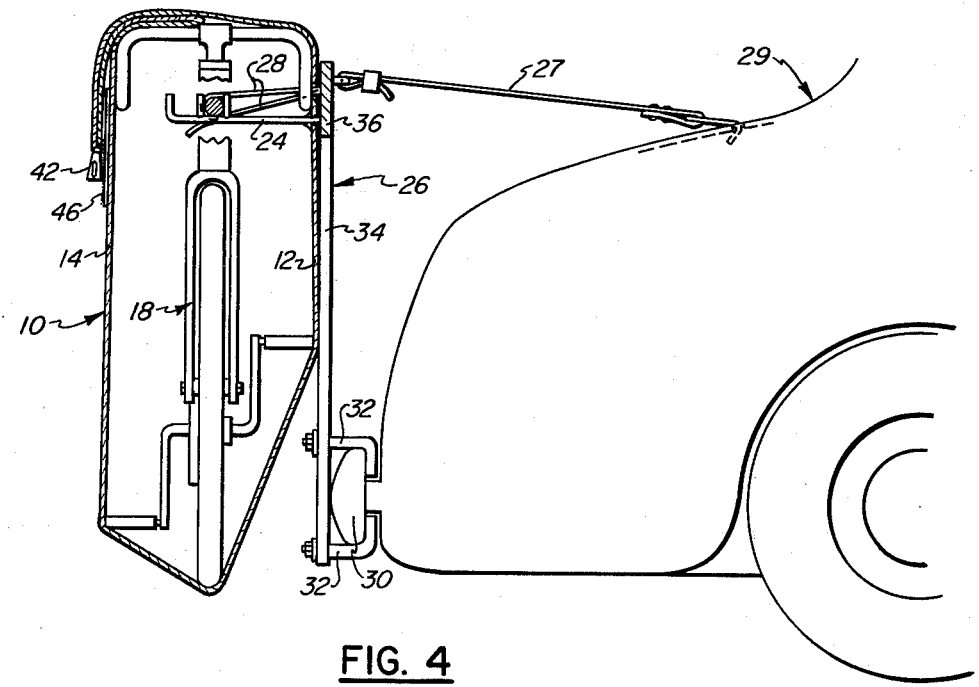
FIG. 4 is a sectional view taken on lines 4—4 of FIG. 1.

If desired, a lock may be attached to the zipper sliders to lock the zippers closed at point 45 (details not shown). The top is folded down as shown in FIGS. 1 and 4 and is affixed in place by two pairs of cooperating Velcro strips 46 and 47. The bicycle is now enclosed and is protected from the ambient environment while being securely fastened to the frame. To remove the bicycle for use, it is necessary to reverse the procedure described for mounting the bicycle to the frame and covering it with the protective cover. The length of Velcro strips is sufficient to accommodate for variations in the bicycle seat and handle bar heights. Of course other suitable fasteners may be used instead of Velcro.

It is also within the contemplation of the invention to utilize the mounting and cover for more than one bicycle and for ladies' bicycles as well as for men's bicycles.

While a particular embodiment of the invention has been shown and described, it is apparent to those skilled in the art that modifications are possible without departing from the spirit of the invention or the scope of the subjoined claims.

The embodiments of the invention in which an exclusive property or privilege is claimed are defined as follows.

1. In a system for protecting a two wheeled vehicle such as a bicycle, having a seat and handle bars, while transporting the same on the back of an automobile having a frame affixed to the bumper and to an upper portion of the automobile, the frame being provided with a pair of spaced hangers to receive the bicycle and straps for holding the bicycle to the frame, the improvement comprising:
   a back of flexible material having a first pair of openings to permit the spaced hangers to pass therethrough, a second pair and a third pair of openings each of which are positioned to permit one of the straps to pass therethrough to affix the bicycle to the frame;
   a front of flexible material affixed at the bottom edge thereof to the corresponding edge of the back;
   closure means affixed to the free edges of the front and back to permit them to be joined together to enclose and protect the bicycle from the ambient environment;

the upper portions of the front and back projecting above the top of the two wheeled vehicle to allow for variations in the heights of the seat and handle bars; and fastening means for securing the joined upper portions of the front and back to the front when said joined upper portions are folded over toward the front.

2. The invention of claim 1 wherein:
the closure means comprises a pair of zippers whose sliders meet at the top of the upper portions of the joined front and back.

3. The invention of claim 2 wherein:
the fastening means comprises at least one Velcro fastener.

4. The invention of claim 3 including:
openings in the bottom at the joined edges of the front and back to permit collected liquid to drain therethrough.

5. The invention of claim 2 including:
openings in the bottom at the joined edges of the front and back to permit collected liquid to drain therethrough.

6. The invention of claim 1 including:
openings in the bottom at the joined edges of the front and back to permit collected liquid to drain therethrough.

7. The invention of claimm 1 wherein:
the fastening means comprises at least one Velcro fastener.

* * * * *